Patented June 8, 1943

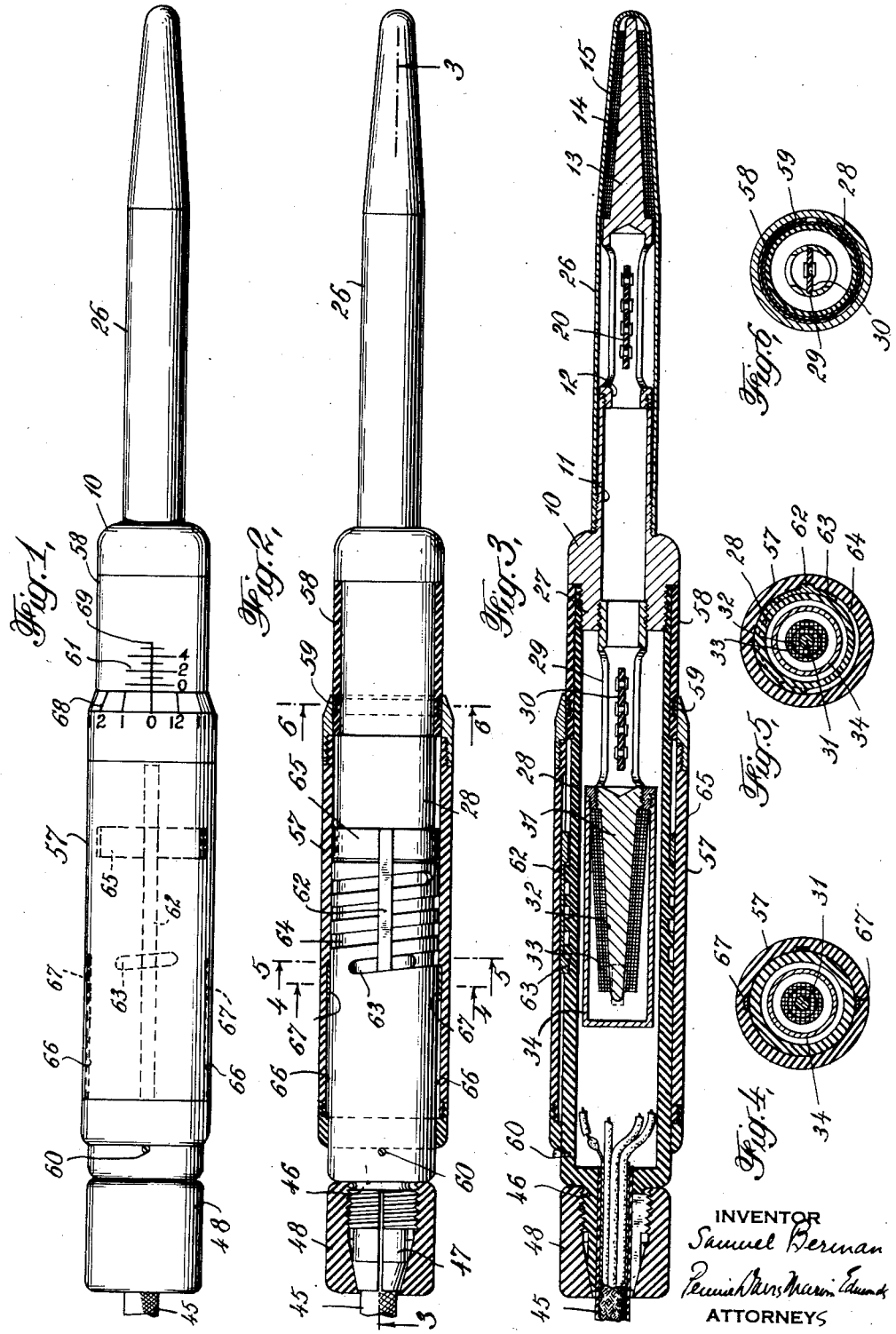

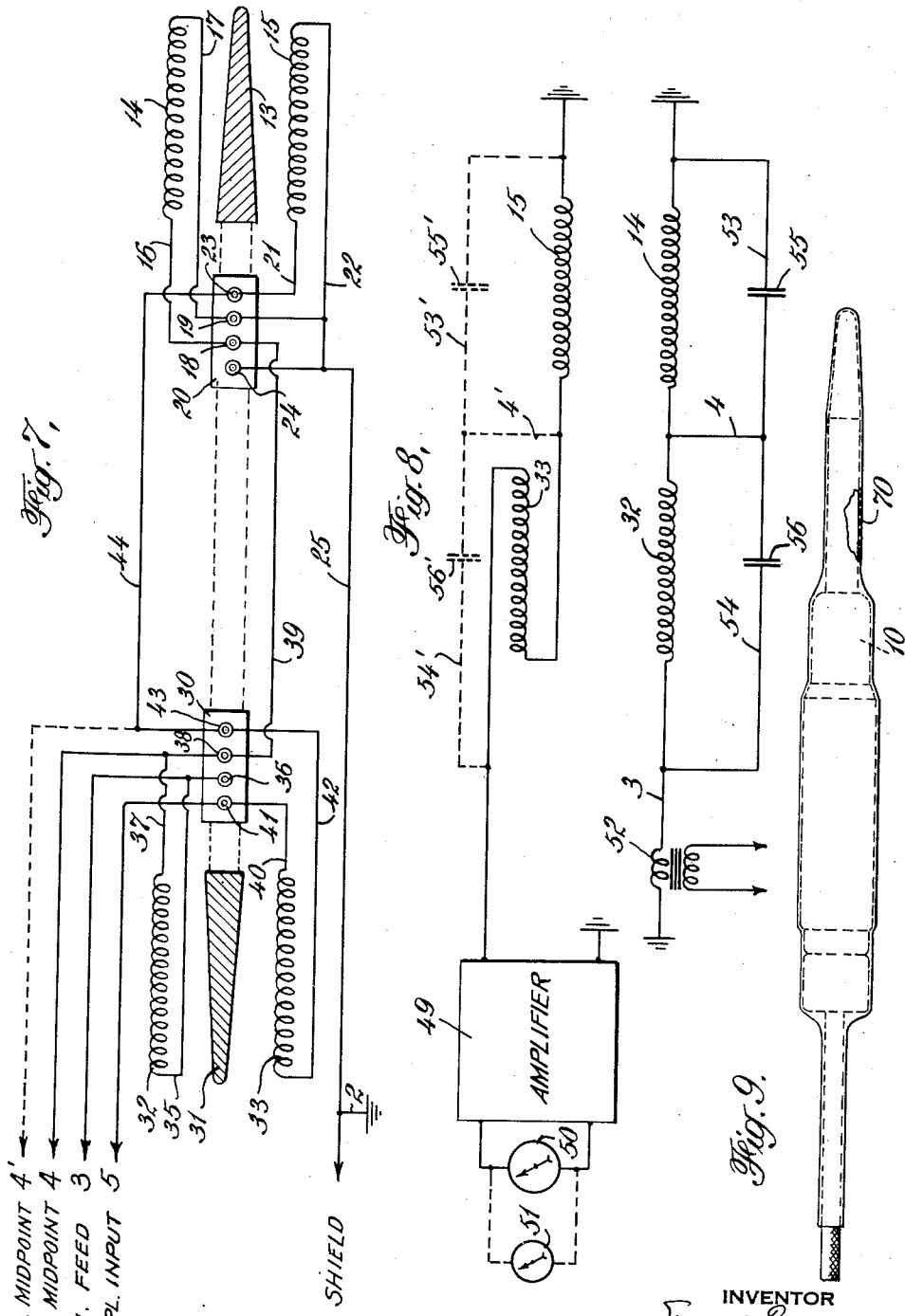

2,321,356

UNITED STATES PATENT OFFICE 2,321,356

LOCATOR

Samuel Berman, Richmond Hill, N. Y., assignor to Waugh Equipment Company, New York, N. Y., a corporation of Maine Application June 2, 1942, Serial No. 445,451

15 Claims. (Cl. 177—311)

This invention relates to devices for determining the presence and location of metallic particles in body tissue and is concerned more particularly with a device for the purpose mentioned which is constructed in accordance with the principles of the invention disclosed in my prior application Serial No. 426,851, filed January 15, 1942, and is an improvement on the device of that application. In its improved construction, the instrument includes a number of novel features which facilitate its use and increase its accuracy and sensitivity.

The instrument of the prior application includes a probe which comprises, in one form, a metallic shell enclosing a pair of windings in inductive relation and consisting of a primary and a secondary mounted on a core and resembling a transformer. A similar pair of windings on a core are disposed at a distance from the probe and the respective primary and secondary windings are connected in series with the secondaries in opposition. The primaries are connected to a supply of current and the secondaries are connected to an amplifier, the output of which is in turn connected to an indicating device. If the transformers were identical and conditions in their fields the same, a flow of current through the primaries would produce no flow to the amplifier and no indication would be given. However, if the probe were brought sufficiently close to a particle of metal to disturb and alter the character of the field around the probe transformer, the original balance would be upset with the result that current would flow to the amplifier and an indication would be given. In view of the difficulty of constructing transformers so nearly alike that the secondaries are completely opposed, the core of the second transformer of the instrument carries an auxiliary winding connected to a variable load in the form of resistance or capacity or both and by variation of this load, the desired initial balance of the secondaries may be established. Thereafter, on movement of the probe into proximity to a piece of metal, the indicator gives an indication of the presence of the metal.

In the instrument of the prior application, the transformers are at a considerable distance apart, one being in the probe at the operating table and the other in a casing remote from the table and containing the amplifier and other auxiliary equipment. Because of the separation of the transformers, metal objects or stray fields near the operating table are likely to upset the initial balance of the transformers and it is then necessary that the instrument be given a further adjustment just before the exploration starts. Also, such adjustments may be required from time to time during the use of the instrument and since they are made at the casing, the surgeon cannot make them without interference with his work. Accordingly, in the use of the prior instrument, it has been the practice to have an attendant at the casing to make the necessary adjustments of the apparatus while the surgeon manipulates the probe.

In the prior instrument, the shell of the probe was commonly made of metal and that material was preferred, since such a metal shell is rigid enough to afford adequate protection to the windings, connections, etc., within it without being of substantial wall thickness and is also capable of withstanding sterilization temperatures. However, when any of the ordinary metals were employed for the shell, the increase in the resistance of the shell resulting from the increase in temperature arising from its contact with body tissue disturbed the initial balance of the instrument and thus produced a false indication.

The new instrument is so constructed as to overcome the difficulties above referred to and, in addition, it includes means by which the initial adjustment to place it in operating condition can be readily obtained and the effect of minor disturbing influences can be overcome at the probe itself. Also, the new instrument is provided with means by which it can be given increased sensitivity and the probe can be readily placed in sterile condition and at the operating table.

The new instrument includes a probe provided with a handle and these parts form a housing which contains the windings and core making up the respective probe and balancing transformers. The transformers are thus in close proximity and subjected to the same local conditions and both transformers and their related parts, which would affect their action, are made with the utmost care and the transformers are matched with extreme precision. Adjustable balancing means are also provided on the handle of the probe and such means are used to make such variations in the circuits as are necessary to take care of local conditions, such as fluctuation in the line voltage, etc. and also for effecting adjustment in the balancing transformers which give the instrument maximum sensitivity.

The shell of the probe of the new instrument is made of a non-metallic material, such as a suitable plastic, and when the use of a sterile probe is required, this result is accomplished by covering the entire probe, including the handle and a few inches of the cable, with a rubber sleeve which has been sterilized in the same manner as the gloves employed by the surgeon, that is, in an autoclave by dry heat. The use of such a rubber sleeve makes it unnecessary to remove any part of the probe for sterilization purposes or to subject the probe to the effects of high temperature or to the action of liquids. Also, when the instrument may be required for several operations in rapid succession, as, for example, in a military hospital, the repeated sterilizations that are necessary are accomplished merely by removing one sleeve and replacing it by another which has been previously sterilized.

Instead of being made of plastic material, the probe shell may be of glass, hard rubber, etc., and all such non-metallic materials are advantageous because of their low cost and because the removal and replacement of a non-metallic shell in no way affects the electrical circuits of the instrument. In instruments for some purposes, however, it may be desirable to form the probe shell of metal because of the greater rigidity and strength provided by that material. In such an instrument, the balancing transformer in the handle of the probe is enclosed within a metal shell to balance the effect on the electrical circuits of the metal of the probe shell and both shells are made of an alloy which is non-magnetic and the resistance of which does not vary substantially throughout the range of temperatures to which the probe is exposed under ordinary conditions.

For a better understanding of the invention, reference may be had to the accompanying drawings in which Fig. 1 is a view of the instrument in side elevation;

Fig. 2 is a similar view with parts removed;

Fig. 3 is a longitudinal section on the line 3—3 of Fig. 2 with connections omitted;

Figs. 4, 5, and 6 are sectional views on the lines 4—4, 5—5, and 6—6, respectively, of Fig. 2;

Fig. 7 is a diagrammatic view illustrating the electrical circuits in the instrument and the connections to the cable;

Fig. 8 is a circuit diagram of the complete apparatus; and

Fig. 9 is a view of the probe in side elevation showing the application of the sterile sleeve.

The instrument is illustrated in the drawings in a form which comprises a housing including a centrally located hollow block 10 of brass or similar non-magnetic material from which extends a tube 11 preferably integral with the block. A structure 12 is mounted on the free end of the tube 11 and this structure is provided with one or more openings through which access to the interior of the structure may be had. A core 13 extends from the structure 12 and it is made of a specially selected core material having high permeability and low hysteresis and eddy current losses. On the core are wound primary and secondary windings 14, 15 and leads 16, 17 of the primary are connected to terminals 18, 19, respectively, on a plate 20 of insulating material mounted within the structure 12, with the terminals accessible from the outside of the structure. The leads 21, 22 of the secondary are connected, respectively, to terminals 23, 24 and terminals 19 and 24 are grounded through a connection 25.

The tube 11, structure 12, and the core, windings, etc., are enclosed within a shell 26 which may be held in place by being screwed on threads formed on the outer surface of tube 11 adjacent the block 10. The shell 26 may be made of any suitable non-magnetic material, such as a plastic material of suitable strength and rigidity, glass, hard rubber, etc. and such non-metallic materials are preferred because of their low cost and ease of manufacture. For some purposes, however, the shell may be made of metal and, in that case, it is preferably formed of the alloy known commercially as "Advance," which does not vary substantially in resistance throughout the range of temperatures from, for example, 50° F. to 250° F.

At the side of the block 10 opposite to that from which shell 26 extends, the block has a threaded neck 27 on which is screwed one end of a tubular body 28 of insulating material forming part of the handle of the instrument. A structure 29, generally similar to structure 12, extends from block 10 into the handle and structure 29 has one or more openings similar to those of structure 12. Within structure 29 is mounted a plate of insulating material 30 carrying a number of terminals accessible through the openings in the structure. A core 31, generally similar to core 13, extends from the free end of structure 29 into the handle and the core carries windings 32 and 33. The windings and core are enclosed within a shell 34 on the end of the structure 29 and, when the probe shell 26 is made of plastic material, the shell 34 is made of any suitable non-metallic material and serves merely to protect the windings on core 31. When shell 26 is made of metallic material, shell 34 is made of the same material so as to balance the effect of shell 26 on the electrical circuits.

The winding 32 on core 31 is a primary winding and it has one lead 35 connected to a terminal 36 on the plate 30 to which is also connected a current supply line designated 3 and identified as "Pri. feed." The other lead 37 of winding 32 is connected to terminal 38 on the plate 30 which is, in turn, connected by line 39 to terminal 18 on block 20. The primary windings 14 and 32 are thus connected in series with the primary feed line. A connection 4 identified by the legend "Pri. midpoint" is connected to terminal 38 on plate 30 and is employed for a purpose to be described.

The secondary winding 33 on core 31 has one lead 40 connected to a terminal 41 on plate 30 to which is also connected the line 5 designated "Ampl. input." The other lead 42 of the secondary winding is connected to a terminal 43 on plate 30 and that terminal is connected by a line 44 to terminal 23 on plate 20. The secondaries are thus connected in series to the line 5 and are opposed to one another. Terminal 43 may also, if desired, be connected to line 4', designated "Sec. midpoint."

The line 25 connected to ground through the line designated 2 is also connected to the shield 26 so that the shield is grounded.

The conductors designated 3 to 5, inclusive, are conductors in a cable 45 provided with a grounded sheath to which the line 25 is connected and which serves as the conductor designated 2. The cable extends through a tubular locking member 46 mounted on the outer end of the handle, this member having a slotted portion 47 engageable by a nut 48 screwed on threads on the locking member. By turning up the nut, the slotted portions of the locking member are caused to clamp the cable so as to hold it against dislodgement The conductors 3 to 5, inclusive, within the cable enter the handle and are connected to the several terminals on the plate 30. Line 25 connected to the cable sheath extends through the handle and into the probe shell and the connections between the terminals on blocks 20 and 30 extend through block 10 and tube 11 in the probe shell.

The cable 45 leads to a casing which is ordinarily placed a distance from the probe and contains an amplifier 49 of the voltage gain type. Across the amplifier output is mounted an indicator device 50 ordinarily located at the casing. If desired, a second such device 51 may be provided, the latter device being portable and thus capable of being placed near the operating table where it can be more conveniently inspected by the surgeon during the operation. Also mounted within the casing is a transformer 52 by which ordinary supply line energy is reduced in voltage. This transformer is connected to the primary feed line 3 and supplies current to the primary windings 14 and 32 in the instrument. The line 5 from the secondaries is connected to the amplifier input.

The primary midpoint line 4 is connected to lines 53 and 54 which are, respectively, in shunt with the primaries 14 and 32 and contain condensers 55, 56, respectively. These condensers are employed to obtain a balance of the transformers with respect to phase and, in some instances, only one such condenser is needed. However, it is preferable to use fixed rather than variable condensers and occasionally it is not possible to obtain the desired result with one or more fixed condensers in shunt with one primary. In that situation, condensers are employed in both lines 53, 54.

Instead of employing condensers in shunt with the primary windings, such condensers may be shunted across the secondary windings 15 and 33. For this purpose, line 4' is employed and it is connected to lines 53' and 54' shunted across the secondaries 15 and 33, respectively, and containing condensers 55' and 56', respectively. The use of capacitance across the primaries is preferred, because it permits balancing without affecting the voltage values, whereas connecting capacitance across the secondaries may have an appreciable affect on the voltages.

In order to obtain the initial balance of the transformers with respect to the voltage values, various expedients may be employed, as, for example, a small piece of iron may be placed in the field of one of the transformers or additional turns may be wound on the balancing unit within the handle and connected in series with the primaries to produce either additive or subtractive effects, the latter being preferred. Usually a few turns of very thin wire are sufficient for the purpose and, in the final balancing stages, it has also been found that by running the primary leads at a slight angle past the balancing unit, a considerable change in voltage balance is obtained.

The balance of the instrument with respect to voltage values and phase accomplished in the manner above described is likely to be upset, when the instrument is put into use, because of fluctuations in line voltage and other local conditions. Accordingly, additional means are provided for balancing the transformers and also for producing a slight unbalance, which has been found to give the instrument maximum sensitivity, and these means are mounted on the handle of the instrument.

The handle balancing means include a sleeve 57 of insulating material mounted on the tubular member 28 for both rotational and longitudinal movement. At its inner end, the sleeve overlies a ferrule 58 of insulating material which abuts the block 10 and is provided with a circumferential groove in which is seated a spring ring 59 which bears against the inner surface of sleeve 57 and serves to hold the sleeve in any position of longitudinal adjustment in which it may be placed. A stop pin 60 at the opposite end of the sleeve limits the movement of the sleeve, so that it cannot be moved to a position in which the spring ring is exposed. Ferrule 58 carries a scale 61 which indicates the position of sleeve 57 lengthwise of the handle.

Sleeve 57 is provided with a longitudinal slot in its inner surface in which is received bar 62 of a slider provided at one end with a crossbar 63 running in a screw thread 64 cut in the outer surface of tubular member 28. The opposite end of bar 62 is connected to a ring 65 encircling the tube 28. The slider is made of non-magnetic material and preferably of the alloy known commercially as "Advance," because of its substantially constant resistance throughout the range of temperatures to which the instrument is likely to be subjected in use. The ring 65 is in effect a phasing winding and, on rotation of sleeve 57, the crossbar 63 moves along screw thread 64, causing an advance of the slider lengthwise of the handle in a direction dependent on the direction of sleeve 57. By placing the slider in different positions relative to the balancing transformer, the phase of the voltage of the secondary of that transformer can be adjusted relative to that of the secondary of the transformer in the probe shell.

The inner wall of sleeve 57 is also provided with a pair of lengthwise slots 66 disposed diametrically and in each slot is seated a small plate 67 of soft iron. By moving the sleeve lengthwise, the pieces of iron are placed in different positions relative to the balancing transformer within the handle and such movement of the sleeve may be made without altering the position of the phasing slider above described. Two pieces of iron are employed in order that rotational movement of the sleeve required for the movement of the phasing slider will not cause voltage variation with an assembly wherein the balancing transformer is slightly off center within the handle. The inner end of the sleeve is provided with a scale 68 which can be read in conjunction with a central line 69 on scale 61 to indicate the rotational position of the sleeve 57.

In the construction of the instrument, the transformers are matched as closely as possible in their manufacture and, when shell 26 is made of metallic material, shell 34 is made of the same material and is so constructed as to have electrical resistance characteristics which are substantially the same as those of shell 26. The transformers are balanced as to phase by the use of one or more condensers 55, 56.

When the instrument is set up in an operating room and connected to the available current supply line, it is quite likely that there will be a difference between the voltage of that line and the voltage of the current supply used in obtaining the initial balance of the transformers at the factory and that this voltage difference will be sufficient to upset the balance. Also, fluctuations in the local line voltage are likely to occur from time to time as various machines may be connected to that line or disconnected therefrom. The balancing means on the handle of the instrument makes it possible to restore the initial balance and, in addition, enable the operator to produce a controlled amount of unbalance necessary to obtain maximum sensitivity.

I have found that if there is a difference between the voltages on the two secondaries, with the higher voltage on the secondary in the probe shell, the sensitivity of the instrument will be increased when employed in the detection of ferrous metals. Similarly, if the voltages on the two secondaries are in balance as to value but one is slightly out of phase with the other, the sensitivity of the instrument will be increased when employed in the location of non-ferrous metals. The plates 67, which are made of iron, and the slider consisting of bars 62, 63 and ring 65, which are made of non-magnetic material, may be so positioned relative to the balancing transformer as to place the transformers in balance with respect both to voltage and to phase, and also to produce such unbalance of the secondary voltages, with respect either to voltage values or to phase relationship, as may be required for maximum sensitivity.

In the adjustment of the instrument immediately prior to use, the sleeve 57 is turned and moved lengthwise until the needle on the indicating instrument 50 shows a minimum deflection. Thereafter, for ferrous metal detection, the sleeve is moved lengthwise until the needle is deflected an amount representing the unbalance which has been found by experience to provide maximum sensitivity. When non-ferrous metals are to be detected, the sleeve is returned to its original position in which the transformers are completely balanced and is, thereafter, rotated to move the phasing slider sufficiently to produce such unbalance of the transformers with respect to phase, as has been found necessary for maximum sensitivity. The extent of the movements of the sleeve can be determined by reference to the scales 61, 68 and after the settings giving maximum sensitivity in the two respects have been determined, the adjustments of the sleeve are thereafter relatively simple.

When the new locator is brought into proximity to a particle of metal, the presence of the metal in the field around the probe causes a deflection of the needle of the indicating instrument and the extent of the movement indicates the size and proximity of the particle. Ordinarily the presence of a particle in the tissue will be determined in advance by radiography, but such X-ray pictures, while establishing the location of the particle, will not always give a sufficiently accurate indication of its depth to enable the surgeon to determine what technique may best be employed in removing it. The sensitivity of the locator is so great that by its use, the depth of the particle can frequently be determined without insertion of the probe into the tissue or at least into close proximity to the particle. For this purpose, the surgeon will obtain a particle of metal similar in size to that shown by the X-ray pictures to be present in the wound and note the deflections of the needle of the indicating instrument produced by placing the probe at various measured distances from the particle. When the probe is then brought close to the particle in the tissue, the deflection of the needle will give a reasonably close indication of the depth of the particle in the tissue.

In the use of that form of the new instrument in which the probe shell 26 is made of non-metallic material, it is ordinarily undesirable to subject the shell to sterilization operations and, in that case, a previously sterilized rubber sleeve 70 is slipped over the probe and handle after the instrument has been finally adjusted and ready for operation. This sleeve may be made of the same type of material as surgeon's gloves and it is sterilized in the same manner. At the completion of the exploration, the sleeve is removed and when a new operation is to start, a new sterilized sleeve is drawn over the probe and handle. Preferably the sleeve is preformed to the general shape of the probe and handle and it is of such shape and length as to fit the probe and handle and also to extend along the cable for a short distance, for example, 4". While a probe having a shell of metallic material may be sterilized and used without the sleeve, it is apparent that the sleeve may be used advantageously with such a probe, particularly when the instrument is to be employed for a series of operations.

The new instrument is superior to the former one in many respects. It is much more stable in operation, since the transformers are in close proximity to one another and thus equally affected by local conditions, and it is much easier to use, since it can be kept in balanced condition by the means on the handle. By the use of such means on the handle, the transformers can be precisely balanced or can be slightly unbalanced under close control. Maximum stability is obtained at the exact balance point, but at some loss of sensitivity. When readjustment is made for maximum sensitivity, the instrument may be slightly unsteady in operation and it is ordinarily used in such unbalanced condition only when very small or deep seated particles are being sought. However, since the balancing adjustments can be made by means on the instrument itself, the surgeon can operate the instrument under whatever conditions he pleases and can make the balancing adjustments quickly and with little interruption of the operation.

I claim:

1. A surgical instrument comprising the combination of a pair of windings consisting of a primary and secondary in inductive relation, a second pair of windings consisting of a primary and a secondary in inductive relation, the pairs of windings being in axial alignment and in proximity to one another, the primaries being connected in series and the secondaries also being connected in series but in opposed relation, a portable housing enclosing the pairs of windings, a portion of said housing having the shape and size of a surgical probe, and connections by which current can be supplied to the primaries and current flowing through the secondaries can be conducted to indicating means.

2. A surgical instrument comprising the combination of a pair of windings consisting of a primary and a secondary disposed in inductive relation, a second pair of windings consisting of a primary and a secondary disposed in inductive relation and in axial alignment with the first pair, a core within each pair of windings, the primaries being connected in series and the secondaries also being connected in series but in opposed relation, a portable housing enclosing the pairs of windings, a portion of said housing having the shape and size of a surgical probe, and connections by which current can be supplied to the primaries and current flowing through the secondaries can be conducted to indicating means.

3. In a surgical instrument, the combination of a pair of windings consisting of a primary and a secondary in inductive relation, a second pair of windings consisting of a primary and a secondary in inductive relation, the pairs of windings being in axial alignment and in proximity to one another, the primaries being connected in series and the secondaries also being connected in series but in opposed relation, a common mounting for the two pairs of windings, and metallic shells enclosing the respective pairs of windings, at least a portion of one of said shells having the shape and size of a surgical probe.

4. In a surgical instrument, the combination of a pair of windings consisting of a primary and a secondary in inductive relation, a second pair of windings consisting of a primary and a secondary in inductive relation, the pairs of windings being in axial alignment and in proximity to one another, the primaries being connected in series and the secondaries also being connected in series but in opposed relation, a common mounting for the two pairs of windings, and metallic shells enclosing the respective pairs of windings, at least a portion of one of said shells having the shape and size of a surgical probe, the shells having the same resistance characteristics with respect to temperature variations.

5. In a surgical instrument, the combination of a pair of windings consisting of a primary and a secondary in inductive relation, a core on which said windings are wound, a second pair of windings consisting of a primary and a secondary in inductive relation, a core on which the second pair of windings are wound, the primaries being connected in series and the secondaries also being connected in series but in opposed relation, the pairs of windings being in axial alignment and in proximity to one another, non-magnetic means serving as a common mounting for the cores and windings, and shells enclosing the respective cores and windings thereon, at least a portion of one of said shells having the shape and size of a surgical probe.

6. In a surgical instrument, the combination of two pairs of windings disposed in axial alignment and in proximity to one another, each pair consisting of a primary and a secondary in inductive relation, series connections between the primaries and the secondaries, respectively, the secondaries being connected in opposed relation, and metallic shells enclosing the respective pairs of windings, the shells being made of a material, the resistance of which does not vary substantially through the range from about 50° F. to about 250° F., at least a portion of one of said shells having the shape and size of a surgical probe.

7. In a surgical instrument, a pair of windings consisting of a primary and a secondary in inductive relation, a second pair of windings consisting of a primary and a secondary in inductive relation and disposed in axial alignment with and in proximity to the first pair of windings, a mounting for the two pairs of windings, and a portable housing enclosing the windings and mounting and having a portion serving as a handle and another portion enclosing one pair of windings and having the shape and size of a surgical probe.

8. In a surgical instrument, a pair of windings consisting of a primary and a secondary in inductive relation, a second pair of windings consisting of a primary and a secondary in inductive relation and disposed in axial alignment with and in proximity to the first pair of windings, a mounting for the two pairs of windings, a portable housing enclosing the pairs of windings and the mounting, said housing including a shell having a portion which is of the shape and size of a surgical probe and encloses one pair of windings and a part of the mounting and a handle enclosing the second pair of windings, and a shell within the handle enclosing the second pair of windings and made of the same material with respect to its electrical characteristics as the first shell.

9. In a surgical instrument, a pair of windings consisting of a primary and a secondary in inductive relation, a second pair of windings consisting of a primary and a secondary in inductive relation and disposed in axial alignment with the first pair of windings, the primaries being connected in series and the secondaries being connected in series and in opposed relation, a shell enclosing one pair of windings, a handle enclosing the second pair of windings, and means on the handle affecting the field of the windings within the handle and adjustable to different positions to vary its effect on said field.

10. In a surgical instrument, a pair of windings consisting of a primary and a secondary in inductive relation, a second pair of windings consisting of a primary and a secondary in inductive relation and disposed in axial alignment with the first pair of windings, the primaries being connected in series and the secondaries being connected in series and in opposed relation, a shell enclosing one pair of windings, a handle enclosing the second pair of windings, and magnetic and non-magnetic balancing means mounted on the handle and adjustable to different positions relative to the windings within the handle.

11. In a surgical instrument, a pair of windings consisting of a primary and a secondary in inductive relation, a second pair of windings consisting of a primary and a secondary in inductive relation and disposed in axial alignment with the first pair of windings, the primaries being connected in series and the secondaries being connected in series and in opposed relation, a shell having a portion which is of the shape and size of a surgical probe and encloses one pair of windings, a handle enclosing the second pair of windings, a sleeve adjustably mounted on the handle, and balancing means mounted on the sleeve and adjustable to different positions relative to the windings within the handle by movement of the sleeve.

12. In a surgical instrument, a portable housing comprising a handle and a shell connected together, a portion of said shell having the size and shape of a surgical probe, a pair of transformers within the handle and shell, respectively, one of said transformers being in said portion of the shell, the windings of the transformers being on a common axis and the primaries and secondaries of the transformers being respectively connected together in series with the secondaries in opposed relation, and connections leading from the handle through which current may be supplied to the primaries and current conducted from the secondaries.

13. In a surgical instrument, a portable housing comprising a handle and a shell connected together, the shell being made of a metallic material, the resistance of which does not vary substantially through the range from about 50° F. to about 250° F., a portion of said shell having the size and shape of a surgical probe, a pair of transformers within the handle and shell, respectively, one of said transformers being in said portion of the shell, the windings of the transformers being on a common axis and the primaries and secondaries of the transformers being respectively connected together in series with the secondaries in opposed relation, a shell enclosing the transformer within the handle and made of the same material as the first shell, and connections leading from the handle through which current may be supplied to the primaries and current conducted from the secondaries.

14. In a surgical instrument, a pair of windings consisting of a primary and a secondary winding in inductive relation, a second pair of windings consisting of a primary and a secondary in inductive relation and in axial alignment with and in proximity to the windings of the first pair, the primaries being connected in series and the secondaries being connected in series and in opposed relation, an enclosure for said pairs of windings having a portion serving as a handle and another portion of a size and shape to serve as a probe shell, and connections by which current can be supplied to the primaries and current flowing through the secondaries may be led away.

15. In a surgical instrument, a pair of windings consisting of a primary and a secondary winding in inductive relation, a second pair of windings consisting of a primary and a secondary in inductive relation and in axial alignment with and in proximity to the windings of the first pair, the primaries being connected in series and the secondaries being connected in series and in opposed relation, an enclosure for said pairs of windings having a portion serving as a handle and another portion of a size and shape to serve as a probe shell, terminals within the enclosure connected, respectively, to the ends of the pair of connected primaries and to the ends of the pair of connected secondaries, a cable extending into the enclosure and containing conductors connected to the respective terminals, and means on the enclosure for clamping the cable in place.

SAMUEL BERMAN.